United States Patent
Wang

(10) Patent No.: US 8,174,976 B2
(45) Date of Patent: May 8, 2012

(54) METHOD AND APPARATUS FOR CONTROLLING MESSAGE TRAFFIC LICENSE

(75) Inventor: Chunyong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 12/328,525

(22) Filed: Dec. 4, 2008

(65) Prior Publication Data

US 2009/0083750 A1     Mar. 26, 2009

(30) Foreign Application Priority Data

Dec. 5, 2007 (CN) .......................... 2007 1 0178796

(51) Int. Cl.
    *G01R 31/08*     (2006.01)
(52) U.S. Cl. ............ 370/230.1; 370/231; 370/233; 370/234; 370/235; 370/395.21; 370/395.41; 370/468; 709/225; 709/226; 455/466
(58) Field of Classification Search .......... 370/229–237, 370/395.21, 395.4, 395.41, 464–468; 709/223–226; 455/466
See application file for complete search history.

(56) References Cited

U.S. PATENT DOCUMENTS

| | | | |
|---|---|---|---|
| 6,597,777 B1 * | 7/2003 | Ho ................................. | 379/133 |
| 7,047,310 B2 * | 5/2006 | Bedekar et al. ............... | 709/232 |
| 7,069,303 B2 * | 6/2006 | Sikora et al. ................... | 709/206 |
| 7,193,966 B2 * | 3/2007 | Gupta et al. ................... | 370/231 |
| 2002/0006125 A1 * | 1/2002 | Josse et al. .................... | 370/354 |
| 2003/0139145 A1 * | 7/2003 | Lee et al. ........................ | 455/69 |
| 2006/0176813 A1 | 8/2006 | Santhanankrishnan | |
| 2009/0109867 A1 * | 4/2009 | Mangetsu ..................... | 370/252 |

FOREIGN PATENT DOCUMENTS

| | | |
|---|---|---|
| CN | 1630250 A | 6/2005 |
| CN | 101060531 A | 10/2007 |
| CN | 101175044 A | 5/2008 |
| EP | 1560384 A | 8/2005 |
| WO | WO-01/03368 A | 1/2001 |
| WO | WO-01/63883 A | 8/2001 |

OTHER PUBLICATIONS

Office Action issued in corresponding Chinese Patent Application No. 200710178796.X, mailed May 10, 2011.

* cited by examiner

*Primary Examiner* — Christopher Grey
(74) *Attorney, Agent, or Firm* — Brinks Hofer Gilson & Lione

(57) ABSTRACT

The present invention relates to a method and an apparatus for controlling message traffic licenses. The method includes: controlling message traffic through an ordinary license; judging whether the triggering conditions of using the first extended license are fulfilled, and, if the triggering conditions are fulfilled, using the first extended license to control the message traffic. The apparatus includes: a license management module, adapted to switch between the licenses according to the triggering conditions of the message traffic license; and a control module, adapted to control the message traffic by using the license selected by the license management module. The method and the apparatus for controlling message traffic licenses provided in an embodiment of the present invention perform hierarchical control on the short message traffic to overcome waste of system resources in the prior art caused by unitary setting of the maximum traffic and reduce the system resources occupied by invalid license traffic in the Short Message Service Center (SMSC).

17 Claims, 3 Drawing Sheets

METHOD AND APPARATUS FOR CONTROLLING MESSAGE TRAFFIC LICENSE

CROSS-REFERENCE TO RELATED APPLICATIONS

This application claims priority to Chinese Patent Application No. 200710178796.X, filed Dec. 5, 2007, which is incorporated herein by reference in its entirety.

FIELD OF THE INVENTION

The present invention relates to the field of communication technologies, and in particular, to a method and an apparatus for controlling message traffic licenses.

BACKGROUND

With the development of communication technologies, Short Message Service (SMS) has become one of the main communication modes of users, and the traffic of short messages is increasing. In a conventional communication network under, the traffic license of the Short Message Service Center (SMSC) system represents the maximum short message traffic allowed by the SMSC. When constructing an SMSC system, the operator constructs the Short Message Service Center according to the peak traffic of the SMSC. In fact, the traffic of the SMSC varies sharply between a holiday and a workday. The short message traffic in a holiday is obviously heavier than that in a workday.

In the current practice, the SMSC sets only one value of the supported maximum short message traffic. The operator has to estimate the maximum short message traffic when constructing an SMSC system, and invest in the construction of the SMSC system according to the maximum short message traffic. However, the short message traffic approaches or reaches the maximum supported traffic value only in the peak period of holidays. At usual time, the system resources are partially idle, which leads to waste of system resources.

SUMMARY

A method and an apparatus for controlling message traffic licenses provided in an embodiment of the present invention are used to overcome waste of system resources in the prior art caused by unitary setting of the message traffic license, implement hierarchical control on the message traffic, and save the system resources.

A method for controlling message traffic licenses provided in an embodiment of the present invention includes: controlling message traffic through an ordinary license; judging whether the triggering conditions of using the first extended license are fulfilled, and, if the triggering conditions are fulfilled, using the first extended license to control the message traffic.

An apparatus for controlling message traffic licenses provided in an embodiment of the present invention includes:

a license management module, adapted to switch between the licenses according to the triggering conditions of the message traffic license; and a control module, adapted to control the message traffic by using the license selected by the license management module.

The method and the apparatus for controlling message traffic licenses provided in an embodiment of the present invention perform hierarchical control on the short message traffic to overcome waste of system resources in the prior art caused by unitary setting of the maximum traffic and reduce the system resources occupied by invalid license traffic in the SMSC.

DETAILED DESCRIPTION

The technical solution of the present invention is hereinafter described in detail with reference to the embodiments and accompanying drawings.

Embodiment 1 of the method for controlling message traffic licenses is detailed.

The SMSC uses the message traffic license to control the traffic of short messages in the system. A message traffic license represents the maximum short message traffic allowed by the SMSC. When the daily short message traffic is not heavy, the SMSC controls the traffic of short messages by using an ordinary license. The maximum short message traffic allowed is set by an ordinary license according to the daily normal short message traffic. In the peak period of short message traffic such as holidays, the maximum short message traffic allowed by the ordinary license is not enough for satisfying the actually traffic of generated short messages. Therefore, the maximum short message traffic supported by the SMSC should be increased, and an extended license is started to control the short message traffic effectively, so that the SMSC can meet the requirements of heavy short message traffic. The extended license extends the maximum short message traffic that may be supported to meet heavy traffic of short messages. Namely, the short message traffic supported by an extended license is heavier than the short message traffic supported by an ordinary license. In addition to an ordinary license, a first extended license is set in an embodiment of the present invention. Moreover, the triggering conditions of the first extended license are set in the present invention. In the process of controlling the short message traffic through an ordinary license, the corresponding module judges whether the triggering conditions of the first extended license are fulfilled, and, if the triggering conditions are fulfilled, the first extended license is applied to control the short message traffic.

Figure 1:
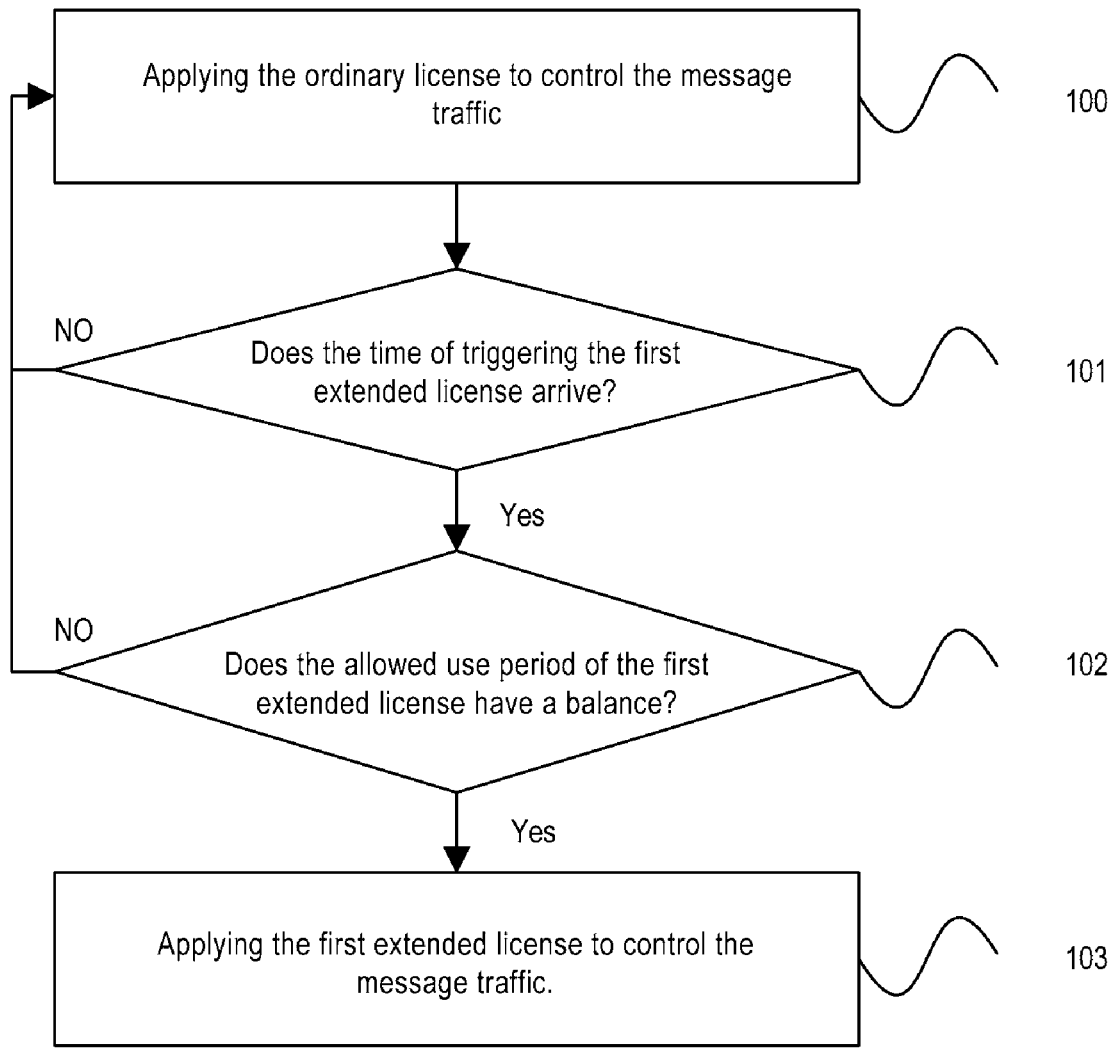
FIG. 1 is a flowchart of controlling message traffic licenses in the first embodiment of the invention.

FIG. 1 is a flowchart of controlling message traffic licenses in the first embodiment of the invention. Further, the process of switching between the ordinary license and the first extended license is shown in FIG. 1, and includes the steps hereinafter.

Step 100: controlling the message traffic by using the ordinary license.

At usual time, when the short message traffic is light, the ordinary license is enough for controlling the short message traffic.

Step 101: judging whether the time of triggering the first extended license arrives at the moment; and, if the time of triggering the first extended license does not arrive at the moment, returning to step 100; if the time of triggering the first extended license arrives at the moment, proceeding to step 102.

When the system time reaches the time of triggering the first extended license, the system gets ready for giving up the ordinary license in use and starting the first extended license to control the short message traffic.

Step 102: judging whether an allowed use period of the first extended license has a balance; and, if the allowed use period of the first extended license does not have a balance, returning to step 100; if the allowed use period of the first extended license has a balance, proceeding to step 103.

Step 103: controlling the message traffic by using the first extended license.

It is judged whether the balance of the allowed use period of the first extended license is empty, after it is determined that the time of triggering the first extended license arrives. If the balance is empty, it indicates that there is no right to use the first extended license currently, namely, the system does not allow to use the first extended license to control the short message traffic. In this case, the ordinary license will continue working to control the short message traffic. If the balance of the allowed use period of the first extended license is not empty, it indicates that there is right to use the first extended license currently. Namely, the system allows to use the first extended license to control the short message traffic. In this case, the system starts the first extended license, and controls the short message traffic according to the maximum message traffic allowed by the first extended license.

The method for controlling message traffic licenses provided in an embodiment of the present invention controls the message traffic by setting different levels of licenses. When the traffic is light, the ordinary license is applied; when the message traffic is heavy in holidays, the extended license is applied. This reduces the cost of constructing an SMSC, and saves the system resources.

Embodiment 2 of the method for controlling message traffic licenses is detailed.

Figure 2:
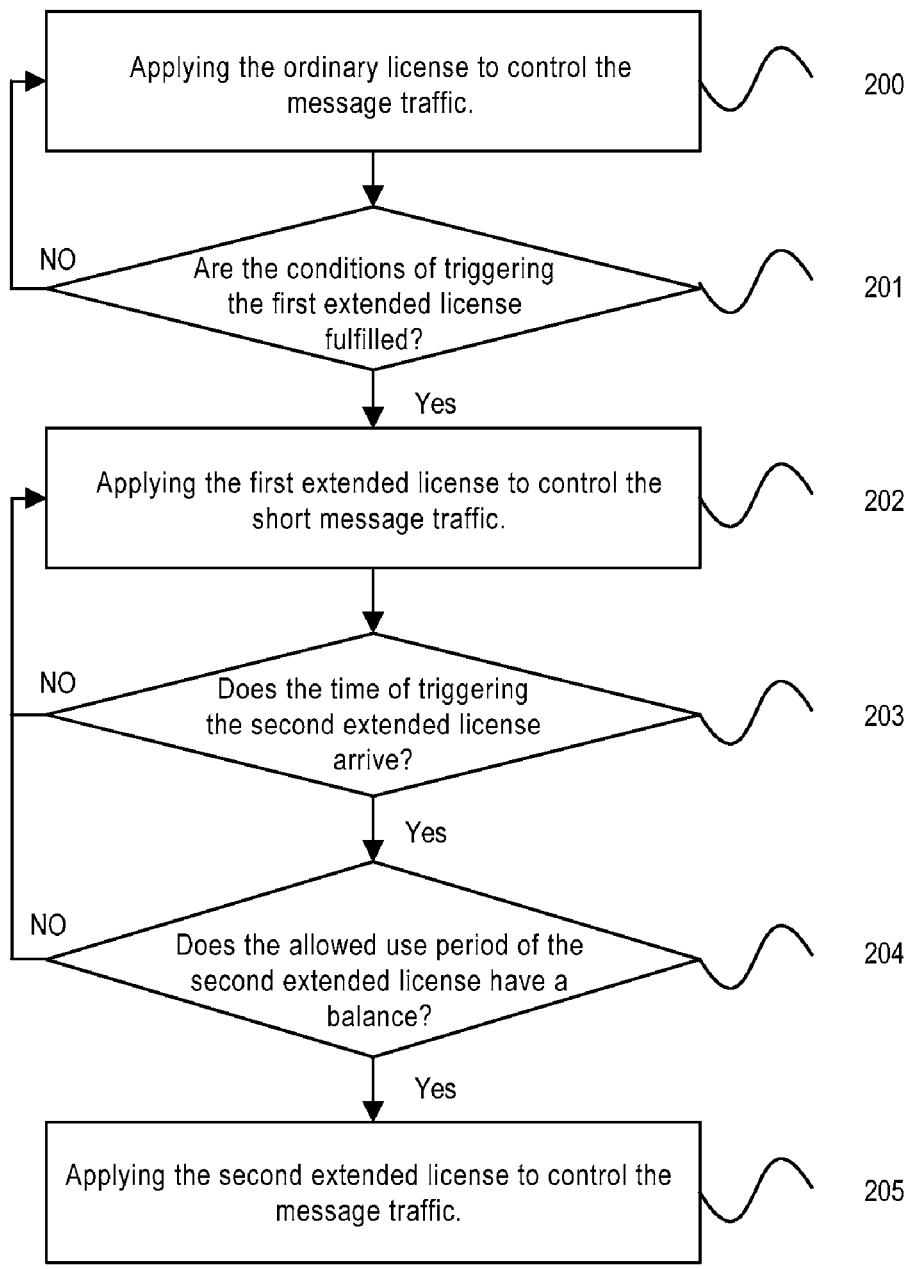
FIG. 2 is a flowchart of controlling message traffic licenses in the second embodiment of the invention.

FIG. 2 is a flowchart of controlling message traffic licenses in the second embodiment of the invention. According to the first embodiment of the method for controlling message traffic licenses, the first embodiment adds a first extended license in addition to the ordinary license to cope with the increase of message traffic in holidays. When the short message traffic is as usual, the ordinary license is applied. In weekends or holidays, the short message traffic is heavier. For example, the short message traffic is the heaviest at the moment near the midnight that ushers in a New Year. Moreover, the burst of heavy traffic continues for a short time. Therefore, the second embodiment adds a second extended license in addition to the first extended license to cope with the traffic peak of short messages. The process of switching between licenses is shown in FIG. 2, and includes the steps hereinafter.

Step 200: controlling the message traffic by using the ordinary license.

Step 201: judging whether the conditions of triggering the first extended license are fulfilled; and, if the conditions of triggering the first extended license are not fulfilled, returning to step 200; if the conditions of triggering the first extended license are fulfilled, proceeding to step 202.

Step 202: controlling the short message traffic by using the first extended license.

Step 203: judging whether the time of triggering the second extended license arrives at the moment; and, if the time of triggering the second extended license does not arrive at the moment, returning to step 202; if the time of triggering the second extended license arrives at the moment, proceeding to step 204.

Step 204: judging whether the allowed use period of the second extended license has a balance; and, if the allowed use period of the second extended license does not have a balance, returning to step 202; if the allowed use period of the second extended license has a balance, proceeding to step 205.

Step 205: controlling the message traffic by using the second extended license.

The process of judgment applied in the first embodiment of the method for controlling message traffic licenses is also applied to step 201 "Judging whether the conditions of triggering the first extended license are fulfilled". A second extended license is set in addition to the first extended license, so that the short message traffic can be controlled under licenses of three levels according to the time segments of the short message traffic. The short message traffic is controlled by the ordinary license in workdays, by the first extended license in weekends or holidays, and by the second extended license in peak periods of short message traffic.

Since the short message traffic increases in different time segments, the time segment of triggering the first extended license and the second extended license can be set before switching between the licenses. In the second embodiment of the present invention, the time segment of triggering the first extended license is set to "*Year*Month*Day~*Year*Month*Day"; and the time segment of triggering the second extended license is set to "*Hour~*Hour". For example, the time segment of triggering the first extended license is set to "2007-10-1~2007-10-7", namely, the time of triggering use of the first extended license is 2007-10-1; and the time of triggering end of using the first extended license is 2007-10-7, with the use period being 7 days. For example, the time segment of triggering the second extended license is "0:00~2:00", namely, the time of triggering use of the second extended license is 0:00, and the time of triggering end of using of the second extended license is 2:00, with the use period being 2 hours. In the second embodiment, the allowed use period of the extended license may be set in addition to the time segment of triggering license. The allowed use period refers to a period allowed by the system to use the first or second extended license. The system sets the allowed use period of the first extended license in the unit of "days", and sets the allowed use period of the second extended license in the unit of "hours". In the process of controlling the short message traffic through the first extended license, with the time of using the first extended license increased, the balance of the use period of the first extended license decreases accordingly. Since the use period of the first extended license is measured in "days", the balance of the allowed use period of the first extended license decreases by 1 day once a day of controlling the traffic through the first extended license has elapsed, until the balance hits 0. Likewise, in the process of controlling the short message traffic through the second extended license, with the time of using the second extended license increased, the balance of the allowed use period of the second extended license decreases accordingly. Since the use period of the second extended license is measured in "hours", the balance of the use period of the second extended license decreases by 1 hour once an hour of controlling the traffic through the second extended license has elapsed, until the balance hits 0. Therefore, switch between extended licenses occurs when the triggering time arrives and the balance of the allowed use period is non-zero.

Based on first and second embodiments of the method for controlling message traffic licenses, in the process of controlling the short message traffic through the first extended license, since the use of the first extended license is limited by an allowed use period, the short message traffic control through the first extended license may be ended upon arrival of the time of triggering end of using the first extended license; since the balance of the allowed use period of the first extended license decreases with the elapse of the time of using the first extended license, the use of first extended license will be ended when the balance hits zero, because zero balance means there is no right to use the first extended license. When the balance of the allowed use period hits zero, the use of the first extended license will stop and the ordinary license will work instead to control the short message traffic regardless of whether the time of triggering end of using the first extended license arrives. Likewise, in the process of controlling the short message traffic through the second license, when the time of triggering end of using the second extended license arrives or the balance of the allowed use period of the second extended license hits zero, the second extended license will stop working and the first extended license will work instead to control the short message traffic.

In the foregoing embodiments of the method for controlling message traffic licenses, the first or second extended license starts working to control the short message traffic when the conditions of triggering use of the first or second extended license are fulfilled, regardless of whether the actual traffic of short messages arrives the maximum short message traffic value supported by the first or second extended license or not at the moment. The foregoing embodiments describe the method for controlling message traffic licenses by assuming that the message traffic is short message traffic. However, the present invention is not limited to the hierarchical control of short message traffic, but applies to all message-based traffic control such as MultiMedia short message Service Center (MMSC) system, WAP gateway, and mail system.

It is understandable to those skilled in the art that all or part steps of the preceding embodiments can be implemented by hardware following instructions of programs. The programs may be stored in a computer readable storage medium. When the programs are executed, the steps including the foregoing embodiments are executed, and the storage medium may be any medium that can store program codes such as read-only memory (ROM), Random Access Memory (RAM), magnetic disk and compact disk.

Embodiment 3 of the apparatus for controlling message traffic licenses is detailed.

Figure 3:
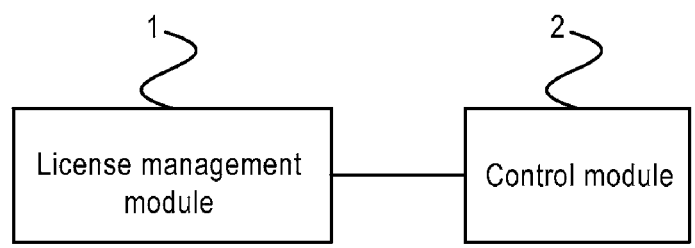
FIG. 3 shows the structure of an apparatus for controlling message traffic licenses in the first embodiment of the invention.

FIG. 3 shows the structure of an apparatus for controlling message traffic licenses in the first embodiment of the invention. As shown in FIG. 3, the apparatus includes a license management module 1 and a control module 2. The license management module 1 is adapted to switch between the licenses according to the triggering conditions of the message traffic license; and the control module 2 is adapted to control the message traffic by using the license selected by the license management module 1.

Figure 4:
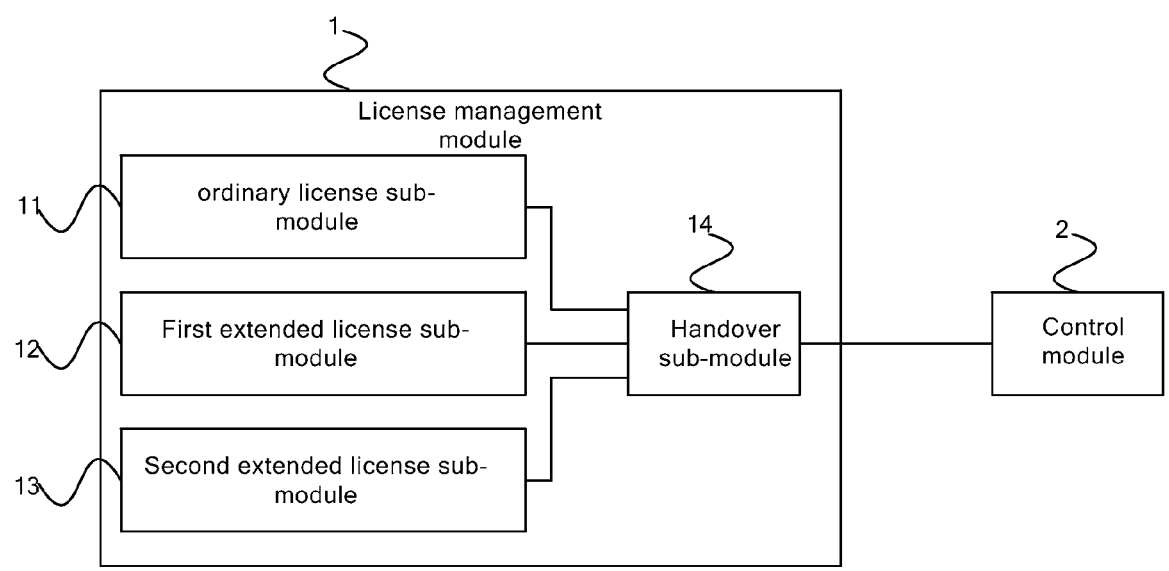
FIG. 4 shows the structure of an apparatus for controlling message traffic licenses in the second embodiment of the invention.

In the apparatus for controlling message traffic licenses, the license management module 1 selects the ordinary license when the short message traffic is light in workdays, and sends the ordinary license to the control module 2; the control module 2 applies the received ordinary license to control the short message traffic; when the license management module 1 determines that the conditions of using the extended license to control the traffic are fulfilled according to the triggering time of the extended license and the balance of the allowed use period, the license management module 1 sends the extended license to the control module 2 to notify the control module 2 to control the short message traffic according to the extended license. Further, FIG. 4 shows the structure of an apparatus for controlling message traffic licenses in the second embodiment of the present invention. As shown in FIG. 4, the license management module 1 includes an ordinary license submodule 11, a first extended license submodule 12, a second extended license submodule 13, and a switching submodule 14. The ordinary license submodule 11 is adapted to store the ordinary license information; the first extended license submodule 12 is adapted to store the first extended license information, the triggering conditions of the first extended license and the allowed use period of the first extended license; the second extended license submodule 13 is adapted to store the second extended license information, the triggering conditions of the second extended license and the allowed use period of the second extended license; the switching submodule 14 is adapted to select the license information stored in the ordinary license submodule 11, the first extended license submodule 12 or the second extended license submodule 13 according to the triggering conditions of the corresponding license. The license management module 1 manages the ordinary license through the internal ordinary license submodule 11. When the short message traffic is light in workdays, the SMSC system invokes the ordinary license stored in the ordinary license submodule 11 through the switching submodule 14, and notifies the control module 2 so that the control module 2 controls the short message traffic through the ordinary license. When the switching submodule 14 determines that the current conditions meet the triggering conditions of using the first extended license, the SMSC system invokes the first extended license stored in the first extended license submodule 12 through the switching submodule 14, and notifies the control module 2 so that the control module 2 controls the short message traffic through the first extended license. When the switching submodule 14 determines that the current conditions meet the triggering conditions of using the second extended license, the SMSC system invokes the second extended license stored in the second extended license submodule 13 through the switching submodule 14, and notifies the control module 2 so that the control module 2 controls the short message traffic through the second extended license. Upon end of using the extended license, the SMSC invokes the ordinary license stored in the ordinary license submodule 11 through the switching submodule 14, and notifies the control module 2 so that the control module 2 controls the short message traffic through the ordinary license.

Although detailed description is made for the foregoing embodiments of this invention to describe rather than restrict the technical solution of the present invention, it is to be understood that those skilled in the field can make various modifications and equivalent substitutions to the technical solutions under the foregoing embodiments of the invention without departing from the spirit and scope of this invention.

What is claimed is:

1. A method for controlling message traffic in a Short Message Service Center (SMSC) system, comprising:
   controlling, by the SMSC system having a processor, a message traffic by using an ordinary license, wherein a maximum short message traffic allowed by the ordinary license is set according to a daily normal short message traffic;
   determining, by the SMSC system, whether it is a time to trigger use of a first extended license, wherein a maximum short message traffic allowed by the first extended license is set according to a short message traffic in weekends or holidays, wherein the maximum short message traffic allowed by the first extended license is heavier than the maximum short message traffic allowed by the ordinary license;

determining, by the SMSC system, whether an allowed use period of the first extended license has a balance when determining it is the time to trigger use of the first extended license arrives; and controlling, by the SMSC system, the message traffic according to the maximum message traffic allowed by the first extended license if the allowed use period of the first extended license has a balance.

2. The method for controlling message traffic in the SMSC system according to claim 1, further comprising:

determining whether triggering conditions of using a second extended license are fulfilled, wherein a maximum short message traffic allowed by the second extended license is set according to a peak short message traffic, wherein the maximum short message traffic allowed by the second extended license is heavier than the maximum short message traffic allowed by the first extended license; and controlling the message traffic according to the maximum message traffic allowed by the second extended license if the triggering conditions are fulfilled.

3. The method for controlling message traffic in the SMSC system according to claim 2, wherein the determining whether triggering conditions of using the second extended license are fulfilled comprises:

determining whether it is a time to trigger use of the second extended license; and wherein the controlling the message traffic according to the maximum message traffic allowed by the second extended license if the triggering conditions are fulfilled comprises:

controlling the message traffic by using the second extended license if it is the time to trigger use of the second extended license at the moment.

4. The method for controlling message traffic in the SMSC system according to claim 3, further comprising:

determining whether an allowed use period of the second extended license has a balance when determining if it is the time to trigger use of the second extended license; and wherein the controlling the message traffic according to the maximum message traffic allowed by the second extended license if the triggering conditions are fulfilled comprises:

controlling the message traffic according to the maximum message traffic allowed by the second extended license if the allowed use period of the second extended license has a balance.

5. The method for controlling message traffic in the SMSC system according to claim 4, further comprising:

decreasing the balance of the allowed use period of the second extended license according to a time of using the second extended license in a process of controlling the message traffic according to the maximum message traffic allowed by the second extended license.

6. The method for controlling message traffic in the SMSC system according to claim 5, further comprising:

ending controlling the message traffic according to the maximum message traffic allowed by the second extended license when a time of triggering end of using the second extended license arrives or the balance of the allowed use period of the second extended license hits zero.

7. The method for controlling message traffic in the SMSC system according to claim 6, further comprising:

setting the time of triggering use of the second extended license, the time of triggering end of using the second extended license and the allowed use period of the second extended license.

8. The method for controlling message traffic in a Short Message Service Center (SMSC) system according to claim 2, wherein the peak short message traffic is defined according to historical short message traffic in peak time.

9. The method for controlling message traffic in the SMSC system according to claim 1, further comprising:

decreasing the balance of the allowed use period of the first extended license according to a time of using the first extended license in a process of controlling the message traffic according to the maximum message traffic allowed by the first extended license.

10. The method for controlling message traffic in the SMSC system according to claim 9, further comprising:

ending controlling the message traffic according to the maximum message traffic allowed by the first extended license when a time of triggering end of using the first extended license arrives or the balance of the allowed use period of the first extended license reaches zero.

11. The method for controlling message traffic in the SMSC system according to claim 10, further comprising:

setting the time of triggering use of the first extended license, the time of triggering end of using the first extended license and the allowed use period of the first extended license.

12. The method for controlling message traffic in a Short Message Service Center (SMSC) system according to claim 1, wherein the daily normal short message traffic is defined according to historical short message traffic in normal day, the short message traffic in weekends or holidays is defined according to historical short message traffic in weekends or holidays.

13. An apparatus for controlling message traffic in a SMSC system having a processor, comprising:

a license management module configured to instruct the processor to switch between different message traffic licenses according to triggering conditions of a message traffic license, wherein the different message traffic licenses comprise an ordinary license and a first extended license, wherein a maximum short message traffic allowed by the ordinary license is set according to a daily normal short message traffic, a maximum short message traffic allowed the first extended license is set according to a short message traffic in weekends or holidays, wherein the maximum short message traffic allowed the first extended license is heavier than the maximum short message traffic allowed by the ordinary license; and a control module configured to instruct the processor to control the message traffic according to the maximum message traffic allowed by a message traffic license selected by the license management module, wherein the license management module is further configured to instruct the processor to send the selected message traffic license to the control module to notify the control module to control a short message traffic according to the selected message traffic license when determining that the conditions of the message traffic license to control the short message traffic are fulfilled according to the triggering time of the extended license and the allowed use period of the selected message traffic license has a balance.

14. The apparatus for controlling message traffic in the SMSC system according to claim 13, wherein the license management module comprises:
- a memory configured to store ordinary license Information, first extended license information, triggering conditions of the first extended license and an allowed use period of the first extended license, and
- to store second extended license information, triggering conditions of a second extended license and an allowed use period of the second extended license, wherein a maximum short message traffic allowed by the second extended license is set according to a peak short message traffic, wherein the maximum short message traffic allowed by the second extended license is heavier than the maximum short message traffic allowed by the first extended license;
- a switching submodule, configured to instruct the processor to select a license information stored in the ordinary license submodule, the first extended license submodule or the second extended license submodule according to the triggering conditions of the corresponding license.

15. A non-transitory computer readable media, comprising logic encoded in the computer readable media, and the logic when executed operable to implement the method comprising:
- controlling a message traffic by using an ordinary license, wherein a maximum short message traffic allowed by the ordinary license is set according to a daily normal short message traffic;
- determining whether it is a time to trigger use of a first extended license, wherein a maximum short message traffic allowed by the first extended license is set according to a short message traffic in weekends or holidays, wherein the maximum short message traffic allowed by the first extended license is heavier than the maximum short message traffic allowed by the ordinary license;
- determining, whether an allowed use period of the first extended license has a balance when determining it is the time to trigger use of the first extended license arrives; and
- controlling the message traffic according to the maximum message traffic allowed by the first extended license if the allowed use period of the first extended license has a balance.

16. An apparatus for controlling message traffic, comprising: a memory and a processor communicating with the memory; wherein
the processor is configured to control a message traffic by using an ordinary license, wherein a maximum short message traffic allowed by the ordinary license is set according to a daily normal short message traffic, determine whether it is a time to trigger use of a first extended license, wherein a maximum short message traffic allowed by the first extended license is set according to a short message traffic in weekends or holidays, wherein the maximum short message traffic allowed by the first extended license is heavier than the maximum short message traffic allowed by the ordinary license, determine whether an allowed use period of the first extended license has a balance when determining it is the time to trigger use of the first extended license arrives, and control the message traffic according to the maximum message traffic allowed by the first extended license if the allowed use period of the first extended license has a balance.

17. The apparatus for controlling message traffic according to claim 16, wherein the processor is further configured to determine whether triggering conditions of using a second extended license are fulfilled, wherein a maximum short message traffic allowed by the second extended license is set according to a peak short message traffic, wherein the maximum short message traffic allowed by the second extended license is heavier than the maximum short message traffic allowed by the first extended license, and control the message traffic according to the maximum message traffic allowed by the second extended license if the triggering conditions are fulfilled.

* * * * *